(12) United States Patent
Fukai et al.

(10) Patent No.: US 7,703,933 B2
(45) Date of Patent: Apr. 27, 2010

(54) MIRROR SURFACE ANGLE ADJUSTING DEVICE

(75) Inventors: Akira Fukai, Shizuoka (JP); Hisaya Suzuki, Shizuoka (JP); Tohru Yamana, Shizuoka (JP)

(73) Assignee: Murakami Corporation, Shizuoka-shi (JP)

( * ) Notice: Subject to any disclaimer, the term of this patent is extended or adjusted under 35 U.S.C. 154(b) by 308 days.

(21) Appl. No.: 11/664,062

(22) PCT Filed: Oct. 8, 2004

(86) PCT No.: PCT/JP2004/014951

§ 371 (c)(1),
(2), (4) Date: Mar. 29, 2007

(87) PCT Pub. No.: WO2006/040803

PCT Pub. Date: Apr. 20, 2006

(65) Prior Publication Data

US 2009/0190243 A1   Jul. 30, 2009

(51) Int. Cl.
*B60R 1/072* (2006.01)
(52) U.S. Cl. ..................................... 359/877
(58) Field of Classification Search .................. 359/873, 359/874, 876, 877
See application file for complete search history.

(56) References Cited

U.S. PATENT DOCUMENTS

| | | | | | |
|---|---|---|---|---|---|
| 4,598,605 | A | * | 7/1986 | Manzoni | 74/502.1 |
| 4,871,246 | A | * | 10/1989 | Manzoni | 359/873 |
| 4,940,321 | A | * | 7/1990 | Yoshida | 359/874 |
| 5,223,985 | A | * | 6/1993 | Guttenberger et al. | 359/872 |
| 5,293,784 | A | * | 3/1994 | Guttenberger et al. | 74/425 |
| 5,331,471 | A | * | 7/1994 | Gilbert | 359/874 |
| 2004/0090691 | A1 | * | 5/2004 | Fukai | 359/877 |
| 2008/0043354 | A1 | * | 2/2008 | Fukai et al. | 359/877 |
| 2008/0310040 | A1 | * | 12/2008 | Suzuki et al. | 359/873 |

FOREIGN PATENT DOCUMENTS

| | | |
|---|---|---|
| JP | 2004-161123 | 6/2004 |
| JP | 2004-230918 | 8/2004 |

* cited by examiner

*Primary Examiner*—Alessandro Amari
*Assistant Examiner*—Mark Consilvio
(74) *Attorney, Agent, or Firm*—Kratz, Quintos & Hanson, LLP

(57) ABSTRACT

An aspect of the present invention is to provide a mirror surface angle adjusting device in which an assembly error between first housing (A1) and second housing (A2) does not affect the assembly accuracy of worm wheels (A71) badly, and which can be assembled by simple and prompt processes. The mirror surface angle adjusting device according to the aspect is characterized in that the worm wheels (A71) contained in the actuator (A) are held by the second housing (A2) in such a way that the worm wheels are not detached along their respective central axes and rotate around the respective central axes. This mirror surface angle adjusting device can be assembled by simple and prompt processes. In addition, even if there is any assembly error between the first housing (A1) and the second housing (A2), this error does not affects the assembly accuracy of the worm wheels (A71) badly.

2 Claims, 14 Drawing Sheets

(a)

(b)

(a)

(b)

(a)

(b)

MIRROR SURFACE ANGLE ADJUSTING DEVICE

TECHNICAL FIELD

The present invention relates to mirror surface angle adjusting devices.

BACKGROUND ART

For example, as described in Japanese Unexamined Patent Application Publication No. 2004-161123, a rearview outer mirror provided at a lateral part of an automobile contains a mirror surface angle adjusting device for tiltably holding a mirror.

As shown in FIG. 13, the mirror surface angle adjusting device described in Japanese Unexamined Patent Application Publication No. 2004-161123 is attached to a back side of a mirror M (i.e., a vehicle's front side), and it includes a pivot plate Hc for holding the mirror M through a mirror holder Mh, and an actuator Ac for tiltably holding this pivot plate Hc.

The actuator Ac includes an annular receiving part P of which inner face is molded to a circular shape, and rods Q for pushing or pulling the pivot plate Hc. Although being not shown, the actuator Ac is equipped therein with one or more motors for applying driving power to the rods Q, and both a worm wheel and a worm for transmitting the driving force of the motor to the rods Q.

In addition, as shown in FIG. 14, the pivot plate Hc is provided, at its rear face, with an annular sliding portion P' slidably held by the receiving part P, and a pair of engaging portions Q' mating with tips of the respective rods Q.

Furthermore, when the rods Q move back or forth by controlling the rotational direction and rotational amount of the motor, the pivot plate Hc is tilted with respect to the actuator Ac.

Actually, as shown in FIG. 14, the worm wheel S contained in the actuator Ac is held by being sandwiched between a first housing R1 and a second housing R2 which both constitute a casing of the actuator Ac.

However, in such a structure for holding the worm wheel S, if any assembly error between the first housing R1 and the second housing R2 occurs, the assembly accuracy of the worm wheel S may be affected. For example, if a contact pressure between the worm wheel S and both the housings R1 and R2 excessively increases due to the assembly error between the housings R1 and R2, abnormal noises may be sounded in response to a rotational movement of the worm wheel S, and furthermore, a smooth rotational movement of the worm wheel S may be hindered. Moreover, if an excess gap is formed between the worm wheel S and both the housings R1 and R2 due to the assembly error between the housings R1 and R2, "deviation" occurs in a central axis (i.e., a rotation axis) of the worm wheel S, which may inhibit its smooth rotational movement.

Moreover, in the above-described holding structure for the worm wheel S, the worm wheel S is not secured until the first housing R1 and the second housing R2 are assembled. Therefore, during the manufacture of the actuator Ac, a worker must assemble the first housing R1 and the second housing R2 while being careful not to cause a deviation in the position (i.e., the central axis) of the worm wheel S.

As described above, in conventional mirror surface angle adjusting devices in which the worm wheel S is sandwiched between the first and second housings R1 and R2, the assembly error between the first housing R1 and the second housing R2 has a great influence upon the assembly accuracy of the worm wheel S. Furthermore, the assembly process thereof cannot be done simply and promptly.

DESCRIPTION OF THE INVENTION

In consideration of the above, the present inventors have conducted research and development in order to cope with the above-described problems in the conventional technology, and have finally conceived the present invention. Specifically, an aspect of the present invention is to provide a mirror surface angle adjusting device in which an assembly error between first and second housings does not affect the assembly accuracy of a worm wheel badly, and which can be assembled by simple and prompt processes.

More specifically, a mirror surface angle adjusting device according to an aspect of the present invention has a pivot plate to be attached to a back side of a mirror, and an actuator that holds the pivot plate, and it is characterized in that the actuator includes a first housing, one or more rods for pushing or pulling the pivot plate, one or more motors for providing driving powers to the rods, one or more worm wheels for transmitting the driving powers of the motors to the rods, and a second housing fixed to the first housing. Further, the device is characterized in that the worm wheel is held by the second housing in such a way that each of the worm wheels is not detached along its central axis and rotates around the central axis.

In this mirror surface angle adjusting device, the worm wheel is held mainly by the second housing. Thus, even if there is an assembly error between the first housing and the second housing, the error does not affect the assembly accuracy of the worm wheel badly. Further, the axis of the worm wheel is determined at the time when it is coupled to the second housing. In addition, the worm wheel is not detached along the central axis. Therefore, when the first and second housings are assembled, a worker does not need to be careful not to cause a deviation in the position (i.e., the central axis) of the worm wheel. Furthermore, if the worm wheel is attached to the second housing in advance, the assembly of the worm wheel is completed simply by assembling the first and second housings. Consequently, the mirror surface angle adjusting device can be assembled by simple and prompt processes. Note that the pivot plate is adapted to hold the mirror, and to be directly attached to a back face of the mirror or indirectly attached thereto through a mirror holder or the like.

The second housing may include one or more gear holding parts, each of which has a circular opening formed therein. Furthermore, each of the worm wheels may include an annular gearwheel portion, a tubular portion formed on an inner circumferential face of the gearwheel portion, and an engaging portion formed on an outer circumferential face of the tubular portion. When the engaging portions mate with inner flanges of the openings formed in the gear holding parts, the worm wheels are held by the second housing in such a way that the worm wheels are not detached along their respective central axes and rotate around the respective central axes.

Thus, the worm wheel can be attached to the second housing simply and reliably, and therefore, the assembly processes are further simplified and expedited.

The above-described various aspects and effects of the present invention as well as the other effects and further features thereof will become more apparent from illustrative and nonrestrictive embodiments described in detail below with reference to the appended drawings.

MODE(S) FOR CARRYING OUT THE INVENTION

A best mode for carrying out the invention will be described in detail with reference to the attached drawings. An embodiment to be described below illustrates an example in which a mirror surface angle adjusting device is contained in a rearview outer mirror provided at a lateral part of an automobile. Further, herein, "front and rear", "right and left" and "top and bottom" are defined with reference to a state where the outer mirror is attached at a lateral part of an automobile.

Figure 1:
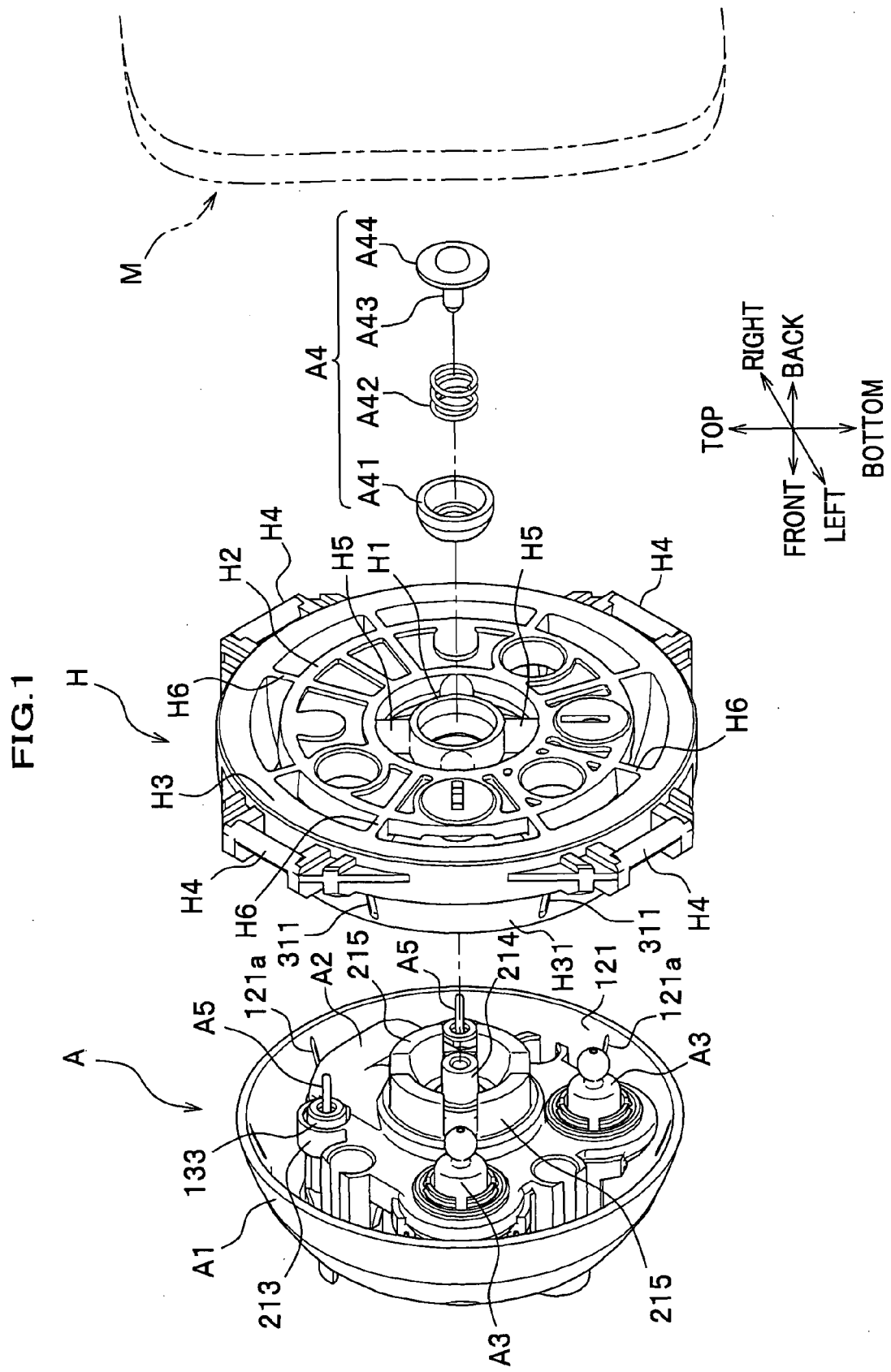
FIG. 1 is an exploded perspective view showing a mirror surface angle adjusting device according to an embodiment of the present invention.
Figure 13:
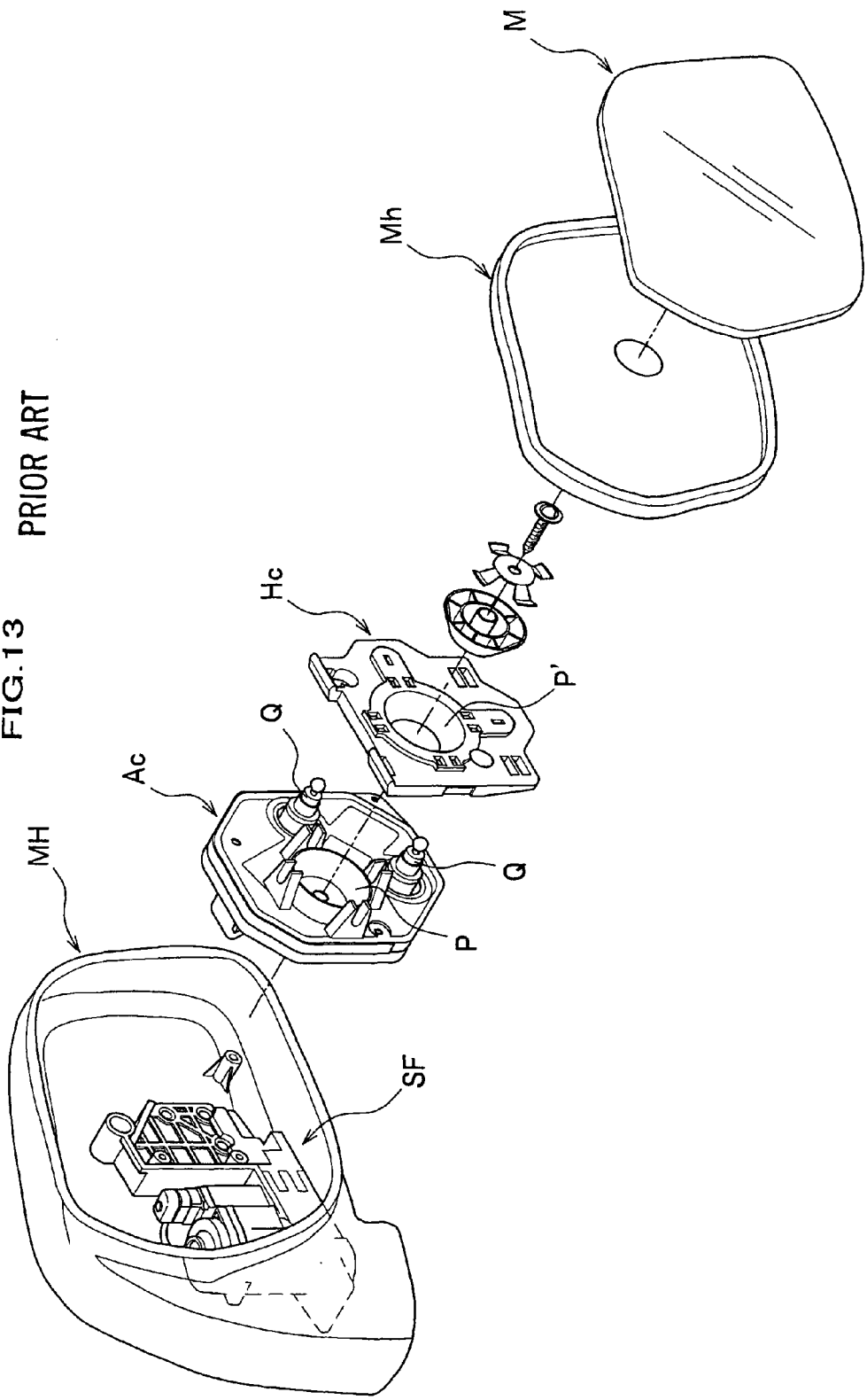
FIG. 13 is an exploded perspective view showing a mirror surface angle adjusting device according to a conventional technology.

As shown in FIG. 1, a mirror surface angle adjusting device according to the embodiment of the present invention is attached to aback side of a mirror M (i.e., a front side in this embodiment), and is formed to include a pivot plate H for holding the mirror M through a mirror holder (not shown), and an actuator A for holding this pivot plate H. In addition, the actuator A is fixed to a mirror housing MH (see FIG. 13) or to a support frame SF (see FIG. 13) integrally attached to this mirror housing MH.

(Pivot Plate)

The pivot plate H includes an annular receiving part H1 formed at a center thereof, an inner annular part H2 surrounding the receiving part H1, an outer annular part H3 surrounding the inner annular part H2, a plurality of mirror attachment parts H4, H4, etc. each of which projects outward from the outer annular part H3, a plurality of connecting rods H5, H5, etc. for connecting the receiving part H1 to the inner annular part H2, and a plurality of connecting ribs H6, H6, etc. for connecting the inner annular part H2 to the outer annular part H3.

The receiving part H1 has a spherical zone shape, and its inner surface is molded to a cylindrical shape. A support cap A41, which will be described later, is to be fitted and inserted into the receiving part H1.

Figure 2:
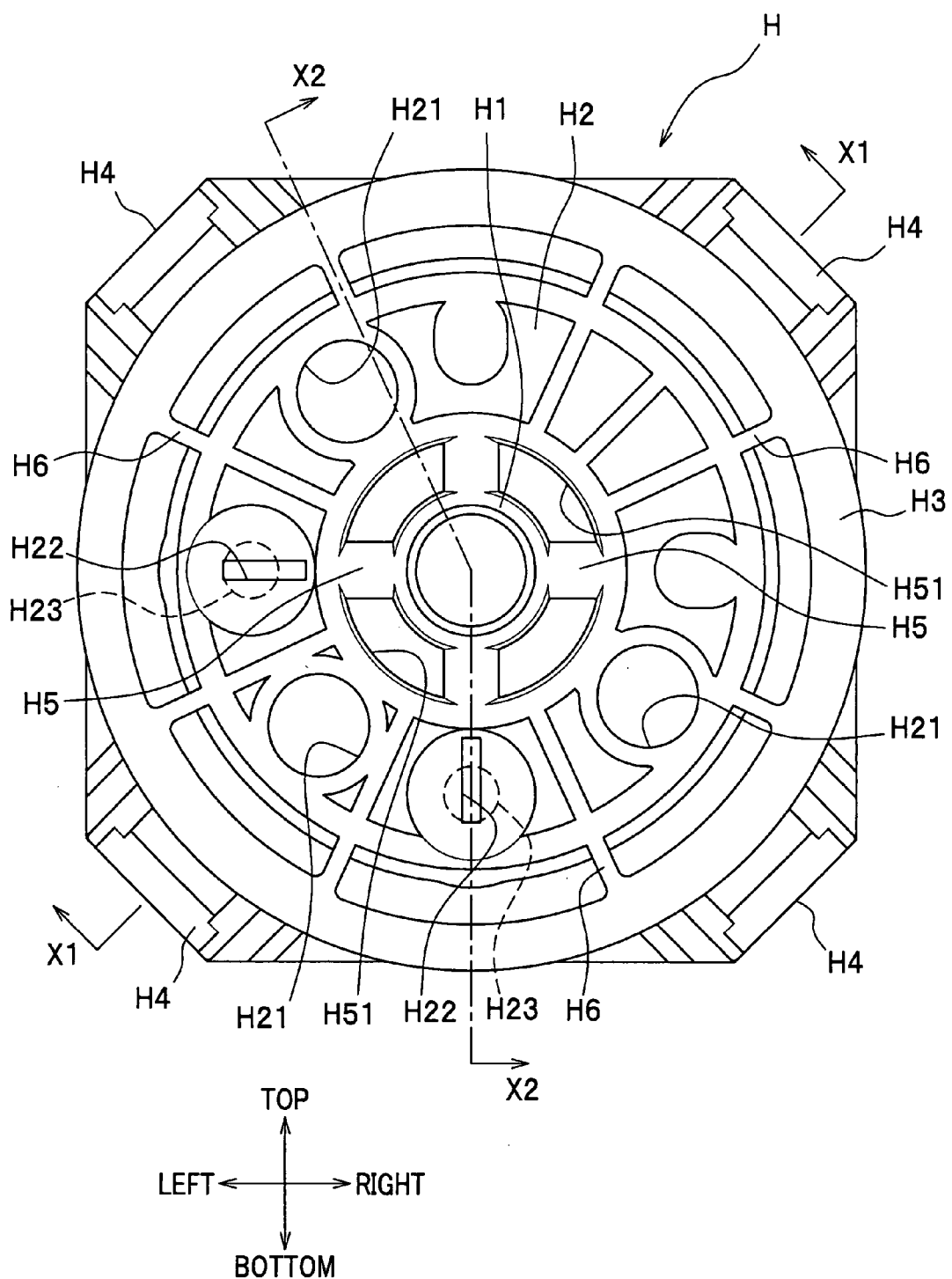
FIG. 2 is a front view of a pivot plate.

As shown in FIG. 2, at the inner annular part H2, a plurality of first through-holes H21, H21, etc. each of which has a circular shape, and two second through-holes H22, H22, etc. each of which has an oblong shape are formed. Further, as shown in FIG. 3(b) which is a cross-sectional view taken along a line X2-X2 in FIG. 2, an engaging part H23 of which inner face is molded to a cylindrical shape is formed at a back side (front side) of the second through hole H22.

Figure 3:
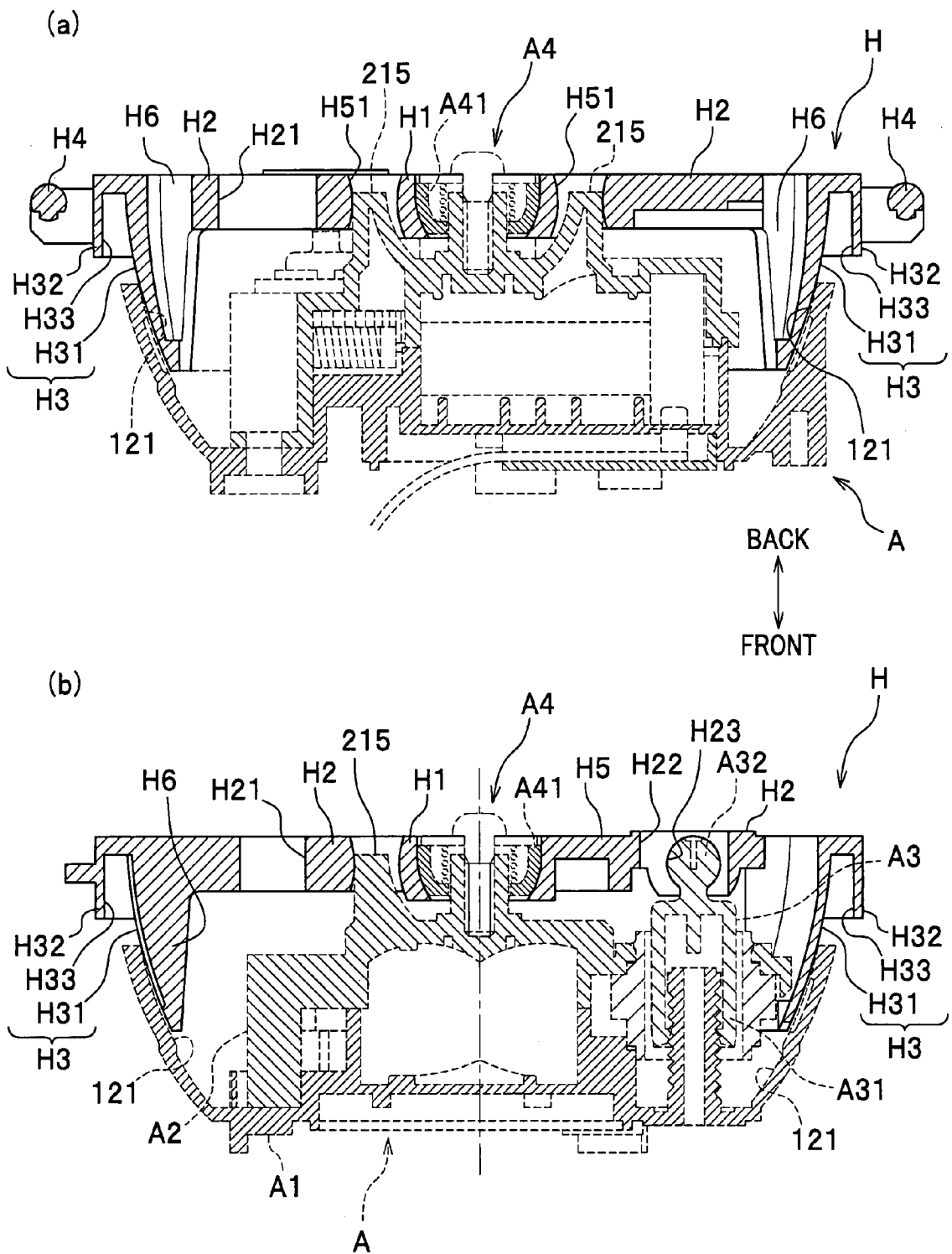
FIG. 3(a) is a cross-sectional view taken along the line X1-X1 in FIG. 2.
FIG. 3(b) is a cross-sectional view taken along the line X2-X2 in FIG. 2.

As also shown in FIG. 3(a) which is a cross-sectional view taken along the line X1-X1 in FIG. 2, the outer annular part H3 includes an annular sliding part H31, and a projected part H32 surrounding this sliding part H31.

As shown in FIG. 1, the sliding part H31 has a spherical zone shape, and its outer surface is molded to a spherical shape. At the outer circumferential face of the sliding part H31, a plurality of linear grooves 311, 311, etc. extending toward the actuator A are formed at intervals. Each linear groove 311 is formed opposite the individual connecting rib H6. In this linear groove 311, a lubricant such as grease is retained.

As shown in FIG. 3(a) and FIG. 3(b), the projected part H32 is molded to have a cross section of an approximate reverse L shape, and a containing groove H33 is formed between the projected part H32 and an outer face of the sliding part H31.

The mirror attachment parts H4 shown in FIG. 1 each serve as a portion which is to mate with a hook (not shown) formed on a back side of the mirror holder (not shown) or a back side of the mirror M. In this embodiment, the mirror attachment parts H4 are each provided to protrude from an outer circumferential face of the projected part H32.

The connecting rods H5 are located to partition an annular space existing between the receiving part H1 and the inner annular part H2, and fan-shaped openings H51 (see FIG. 2) are formed by the connecting rods H5, the receiving part H1 and the inner annular part H2.

The connecting ribs H6 are located to partition an annular space existing between the inner annular part H2 and the outer annular part H3. Furthermore, as shown in FIG. 3(b), each of the connecting rib H6 has an approximately triangular shape, and its end (front end) extends to an end (front end) of the sliding part H31.

It should be noted that the pivot plate H can be molded with synthetic resin such as polyethylene, polypropylene (PP) or polyacetal (POM). In this case, the receiving part H1, the inner annular part H2, the outer annular part H3, the mirror attachment parts H4, the connecting rods H5 and the connecting ribs H6 can be integrally molded.

(Actuator)

Figure 4:
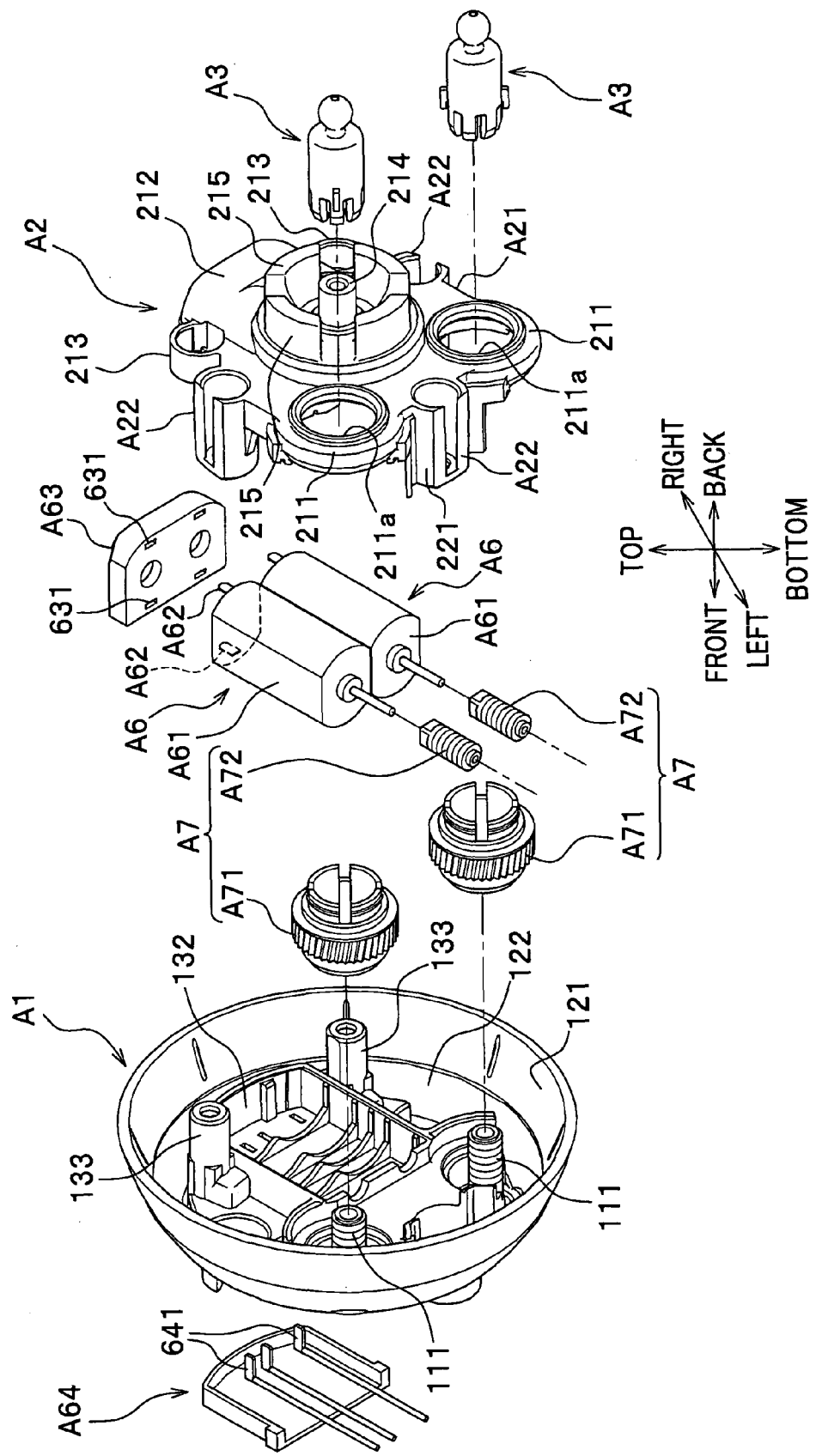
FIG. 4 is an exploded perspective view of an actuator.

As shown in FIG. 1, the actuator A includes a first housing A1 having a bowl-like shape, a second housing A2 fixed to the first housing A1, a pair of rods A3, A3 for pushing or pulling the pivot plate H, a pressing means A4 for pressing the pivot plate H toward the first housing A1, and a pair of position sensors A5, A5 provided to measure the tilt of the pivot plate H. Further, as shown in FIG. 4, the actuator A includes a pair of motors A6, A6 for applying driving powers to the rods A3, A3, and a pair of gears A7, A7 for transmitting the driving powers of the motors A6, A6 to the rods A3, A3.

Figure 5:
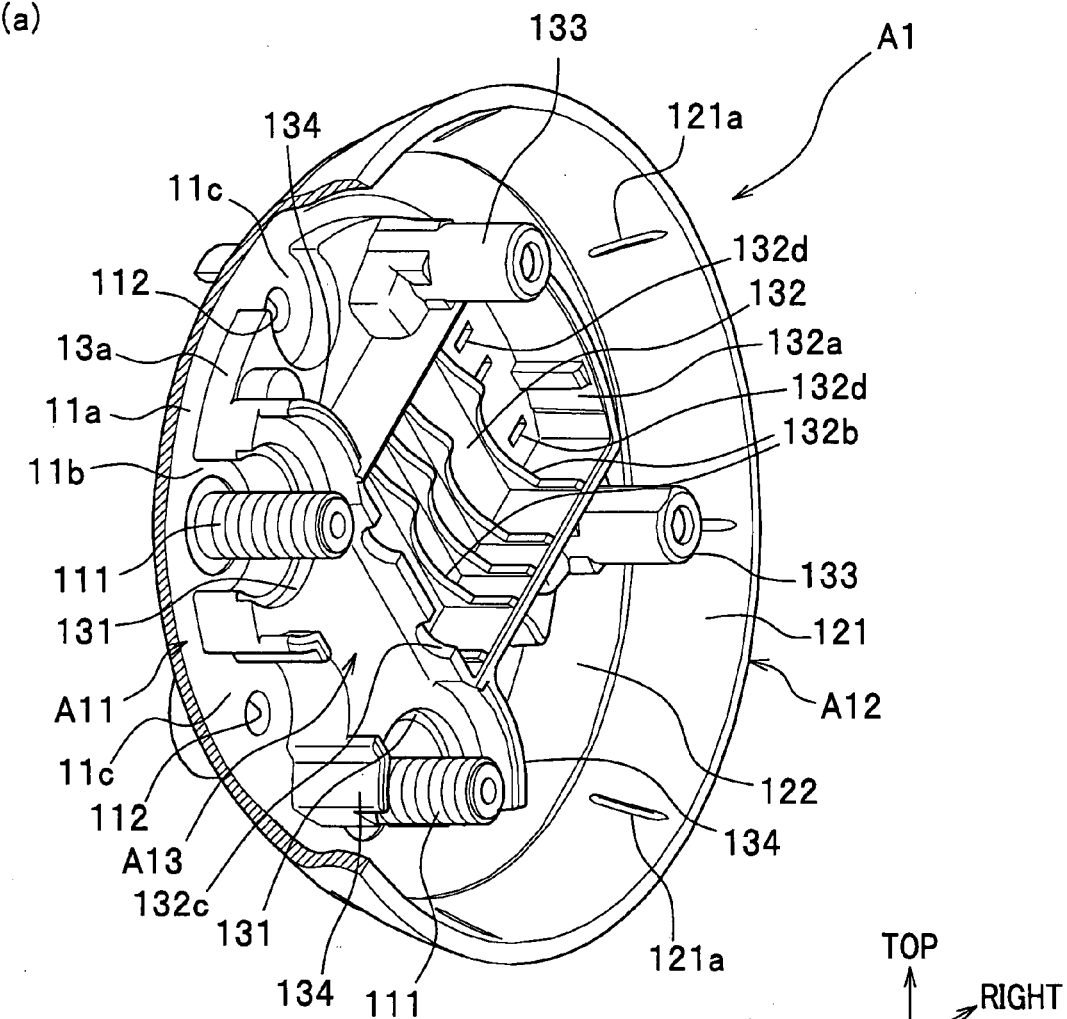
FIG. 5 represents diagrams each showing a housing that is a constituent element of the actuator, in which (a) is a partially cutaway perspective view, and (b) is a partially enlarged view of (a).
Figure 5:
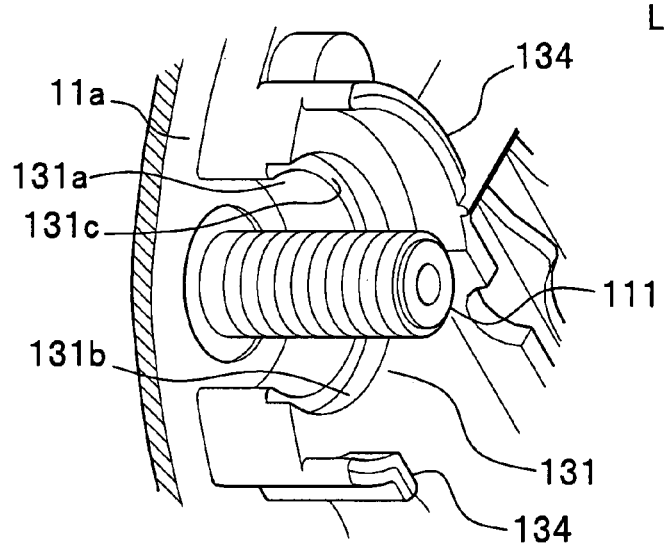

As shown in FIG. 5(a), the first housing A1 has a bottom part A11, an annular circumferential wall part A12 formed at an outer circumferential edge of the bottom part A11, and an island-shaped part A13 formed on an inner circumferential side of the bottom part A11.

Figure 6:
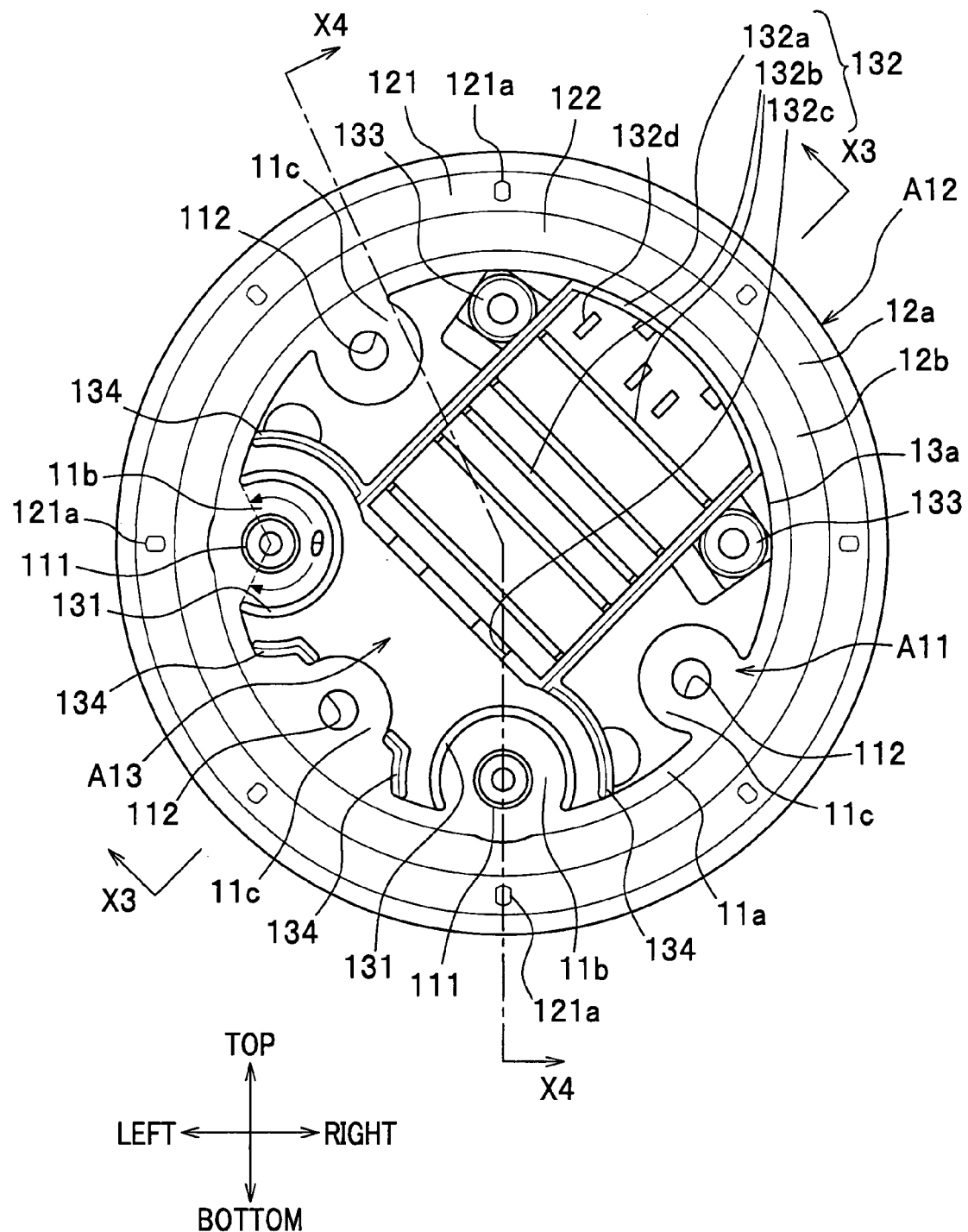
FIG. 6 is a front view of the housing that is a constituent element of the actuator.

As also shown in FIG. 6, the bottom part A11 includes an annular region 11a located surrounding the island-shaped part A13, and a pair of gear placement regions 11b, 11b and a plurality of second housing placement regions 11c, 11c, etc, which are formed extending to the island-shaped part A13 on an inner circumferential side of this annular region 11a. In this embodiment, one of the gear placement regions 11b, 11b is formed at a lowermost part of the annular region 11a, while the other is formed obliquely above the one gear placement region 11b. Each gear placement region 11b has a circular outer edge, and is provided, at its center, with an external thread portion 111 protruding therefrom (see FIG. 5(a)). Further, at a center of each second housing placement region 11c, an attachment hole 112 is formed. It should be noted that the attachment holes 112 are each formed at a position corresponding to that of each first through hole H21 of the pivot plate H shown in FIG. 2.

As shown in FIG. 5(a), the circumferential wall part A12 is formed along an outer circumferential edge of the annular region 11a of the bottom part A11, and has two rear and front ring-like regions 121 and 122 in the present embodiment. It should be noted that, hereinafter, the rear side ring-like region 121 will be referred to as a "receiving part 121", and the front side ring-like region 122 will be referred to as a "lubricant retaining part 122". In other words, the ring-like receiving part 121 is formed at a rear-side edge of the first housing A1.

Figure 7:
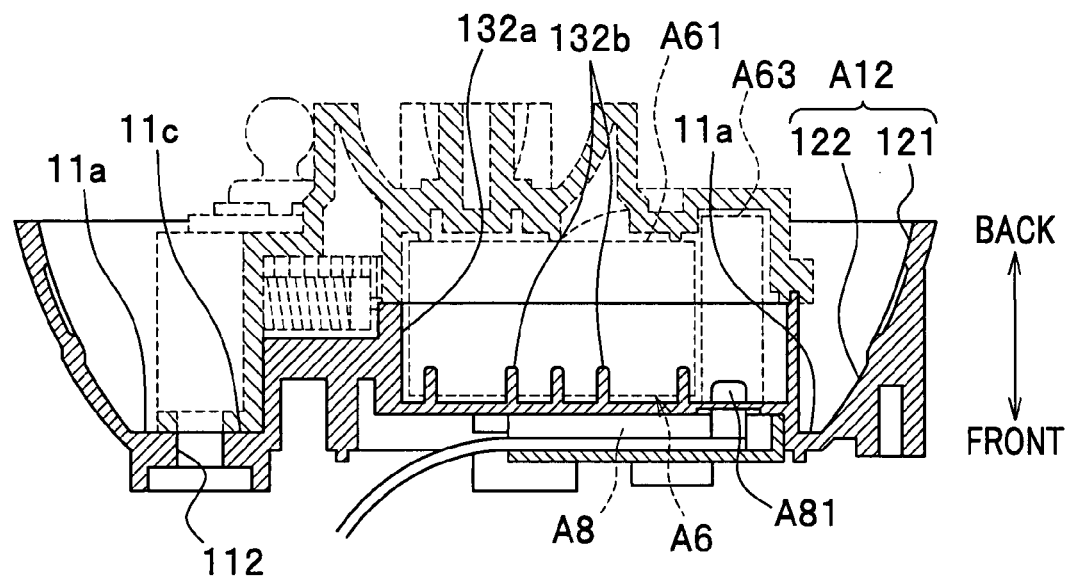
FIG. 7(a) is a cross-sectional view taken along the line X3-X3 in FIG. 6.
FIG. 7(b) is a cross-sectional view taken along the line X4-X4 in FIG. 6.
Figure 7:
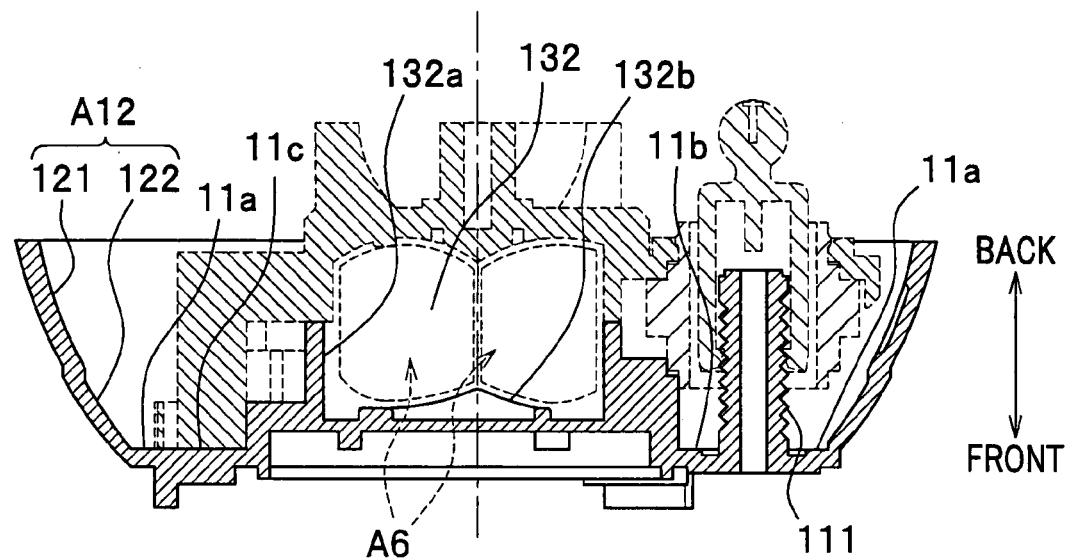
Figure 8:
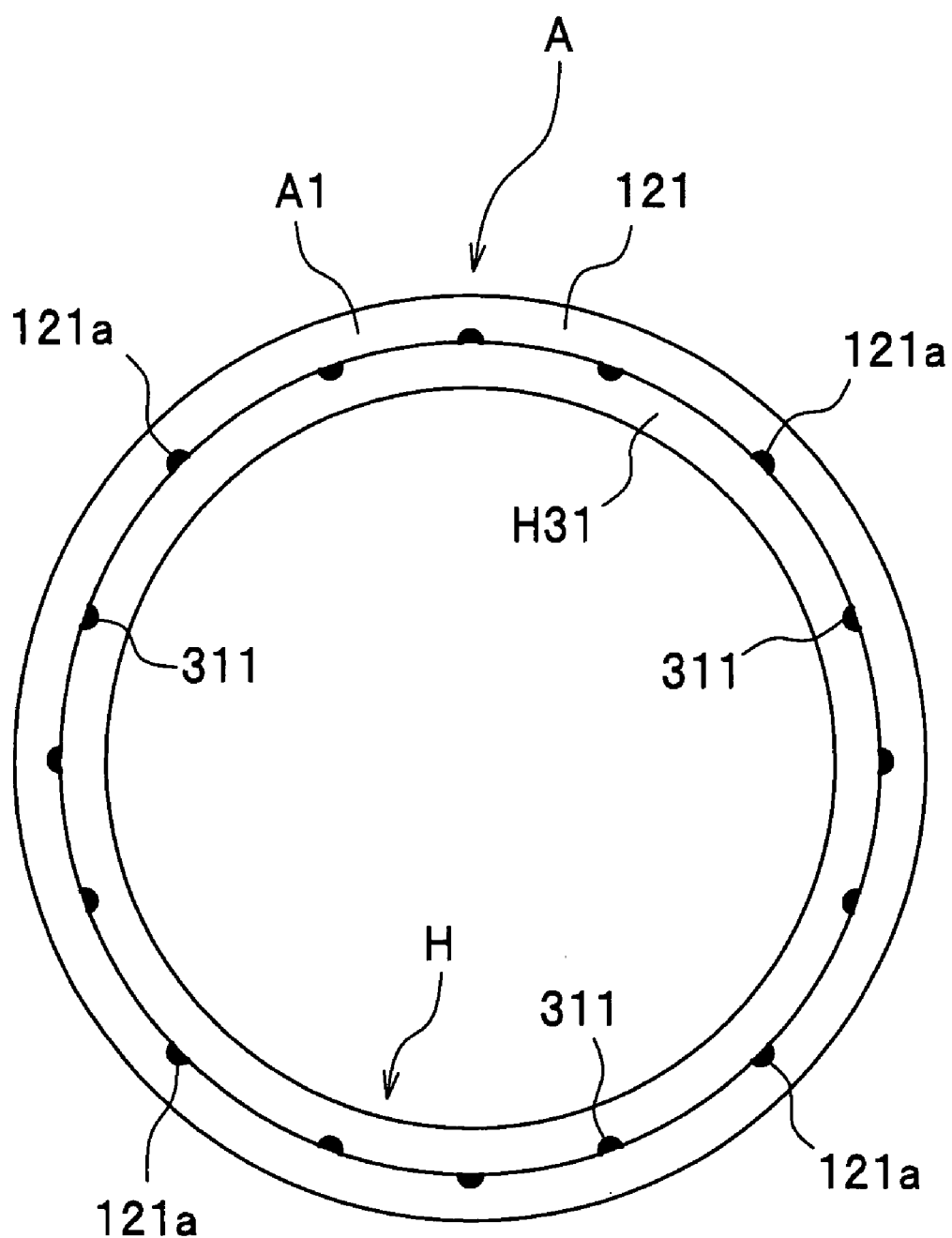
FIG. 8 is a schematic view for describing the location of each linear groove.

The receiving part 121 serves as a portion for tiltably supporting the sliding part H31 (see FIG. 1) of the pivot plate H, and has a spherical zone shape so that its inner surface is molded to a spherical shape, as shown in FIG. 7(a) and FIG. 7(b). FIG. 7(a) is a cross-sectional view taken along the line X3-X3 in FIG. 6, while FIG. 7(b) is a cross-sectional view taken along the line X4-X4 in FIG. 6. In this embodiment, the radius of the spherical face which constitutes the inner circumferential face of the receiving part 121 is substantially equal to the radius of the spherical face which constitutes the outer circumferential face of the sliding part H31 (see FIG. 3(a) and FIG. 3(b)) of the pivot plate H. In other words, the receiving part 121 tiltably abuts against the outer circumferential face of the sliding part H31 (see FIG. 3(a) and FIG. 3(b)) of the pivot plate H. Further, as shown in FIG. 5(a), on the inner circumferential face of the receiving part 121, a plurality of linear grooves 121a, 121a, etc., each of which extends toward the lubricant retaining part 122, are formed in the circumferential direction at intervals. In these linear grooves 121a, a lubricant such as grease is retained. It should be noted that, as shown in the schematic view of FIG. 8, each linear groove 121a of the receiving part 121 is located between the circumferentially adjacent linear grooves 311, 311 of the sliding part H31. In other words, each linear groove 121a at a support face of the receiving part 121 is formed at a position deviated from that of each linear groove 311 at a sliding face of the sliding part H31.

The lubricant retaining part 122 shown in FIG. 5(a) also has a spherical zone shape, and its inner surface is molded to a spherical shape. However, its inner diameter is larger than that of the receiving part 121, and therefore, a step is formed at the boundary between the receiving part 121 and the lubricant retaining part 122 as shown in FIG. 7(a) and FIG. 7(b). The lubricant retaining part 122 has a lubricant such as grease. Every time the pivot plate H (see FIG. 1) is tilted (i.e., every time the sliding part H31 (see FIG. 1) slides on the inner circumferential face of the receiving part 121), the lubricant applied to the lubricant retaining part 122 is supplied to the inner circumferential face of the receiving part 121 and the outer circumferential face of the sliding part H31 through each linear groove 121a of the receiving part 121 and the respective linear grooves 311, 311 (see FIG. 1) of the sliding part H31 (i.e., after the lubricant has been retained therein once) or directly from the lubricant retaining part 122. As a result, the smooth tilting movement of the pivot plate H is maintained.

As shown in FIG. 5(a), the island-shaped part A13 is bulging rearward from the annular region 11a of the bottom part A11, and its outer circumferential edge (outer circumferential face) 13a is opposed to the circumferential wall part A12 across a gap (groove) formed therebetween. In other words, as shown in FIG. 6, the island-shaped part A13 is formed inwardly of the annular region 11a of the bottom part A11, and the outer circumferential edge 13a of the island-shaped part A13 and the circumferential wall part A12 are opposed to each other across the annular region 11a of the bottom part A11 sandwiched therebetween.

In this embodiment, as shown in FIG. 5(a), the island-shaped part A13 has a pair of gear receiving parts 131, 131 formed corresponding to a pair of the external thread portions 111, 111, a motor containing part 132 for containing two motors A6, A6 (see FIG. 2), a pair of sensor attachment parts 133, 133 formed on both sides of this motor containing part 132, and a plurality of support wall parts 134, 134, etc. formed around each gear receiving part 131.

Each gear receiving part 131 serves as a portion for supporting an outer circumferential face of a front end of an after-mentioned worm wheel A71 (see FIG. 4), and is formed around each external thread portion 111 as shown in FIG. 5(b). In the present embodiment, each gear receiving part 131 has an approximate C shape (i.e., circular shape), and is formed on an inner side of the annular region 11a of the bottom part A11. Thus, compared with the case where each gear receiving part 131 is formed into an annular shape having no cutout portions, each gear receiving part 131 can be reduced in volume. Therefore, the flexibility of the layout is enhanced. As a result, the first housing A1 can be made compact. Furthermore, each gear receiving part 131 is not formed into a perfect annular shape, and its opening (i.e., cutout portion) faces the annular region 11a of the bottom part A11. Therefore, in the event that water or the like enters an inner part of the actuator A, there is no possibility of accumulation of water or the like in an inner circumferential portion of each gear receiving part 131 (i.e., around each external thread portion 111).

The configuration of each gear receiving part 131 is described in more detail. Each gear receiving part 131 includes a first circular face 131a opposed to an outer circumferential face of the external thread portion 111, a second circular face 131b located around the first circular face 131a and opposed to the outer circumference of the external thread portion 111, and a third circular face 131c formed between the first and second circular faces 131a and 131b. The central angle of the respective circular faces 131a, 131b and 131c (i.e., the central angle θ of each gear receiving part 131 (see FIG. 6)) is preferably greater than 180° and smaller than 360°. Thus, the outer circumferential face of each worm wheel A71 (i.e., a radial load acting on each worm wheel A71) can be supported stably. As a result, horizontal or vertical "deviation" that may be caused during the rotation of each worm wheel A71 (see FIG. 4) can be reduced.

As shown in FIG. 6, the motor containing part 132 is formed extending from a central portion of the island-shaped part A13 to an upper right portion thereof, and it includes a frame portion 132a having an approximately rectangular shape, and a plurality of ribs 132b, 132b, etc. formed inside this frame portion 132a in the present embodiment. An upper side of the frame portion 132a is circularly molded along the outer circumferential edge 13a of the island-shaped part A13, and on a lower side of the frame portion 132a, two notches 132c through which worms A72 (will be described later) are inserted are formed. Each rib 132b is molded in accordance with the outer shape of each motor A6 (see FIG. 4). Further, at an upper portion of the motor containing part 132, three terminal holes 132d are formed. As long as the terminal holes 132d are provided at an upper portion of the first housing A1, terminals or the like of the motors A6 (see FIG. 4) will not be exposed to the water, even of water enters the inner part of the actuator A.

The sensor attachment parts 133 shown in FIG. 5(a) each serve as a portion where various components that constitute the position sensors A5 (see FIG. 1) are to be contained, and they are each formed into a tubular shape in the present embodiment. As shown in FIG. 6, one of the sensor attachment parts 133, 133 is formed at an uppermost portion of the island-shaped part A13, while the other is formed obliquely below one sensor attachment part 133. In this embodiment, a line segment which connects the external thread portion 111 and the sensor attachment part 133 opposing vertically across the motor containing part 132 is orthogonal to a line segment which connects the external thread portion 111 and the sensor attachment part 133 opposing horizontally across the motor containing part 132.

The support wall parts 134 each serve as a portion for supporting the after-mentioned second housing A2 (see FIG. 4) and in the present embodiment, two large ones and two small ones are formed.

The first housing A1 can be molded with synthetic resin such as polyethylene, acrylonitrile-butadiene-styrene resin (ABS resin), polybutylene terephthalate (PBT resin) or polyamide (PA). In this case, the bottom part A11, the circumferential wall part A12 and the island-shaped part A13 can be integrally molded.

Further, the motor containing part 132, each sensor attachment part 133 and each support wall part 134 shown in FIG. 5(a) may be formed on the inner circumferential side of the annular region 11a of the bottom part A11, and do not need to be formed at the island-shaped part A13. In other words, it is unnecessary to form the motor containing part 132, each sensor attachment part 133 and each support wall part 134 at a portion being higher than the bottom part A11.

The second housing A2 shown in FIG. 4 has a main body A21 that covers the island-shaped part A13 (see FIG. 5(a)) of the first housing A1, and a plurality of leg parts A22, A22, etc. formed around the main body A21.

The main body A21 has a pair of gear holding parts 211, 211 formed corresponding to the gear receiving parts 131, 131 (see FIG. 5(a)), a motor cover part 212 for covering the motor containing part 132, a pair of ring parts 213, 213 formed corresponding to the sensor attachment parts 133, 133, a boss 214 provided to protrude at a rear face of the motor cover part 212, and four pieces of stoppers 215, 215, etc. located surrounding this boss 214.

Figure 11:
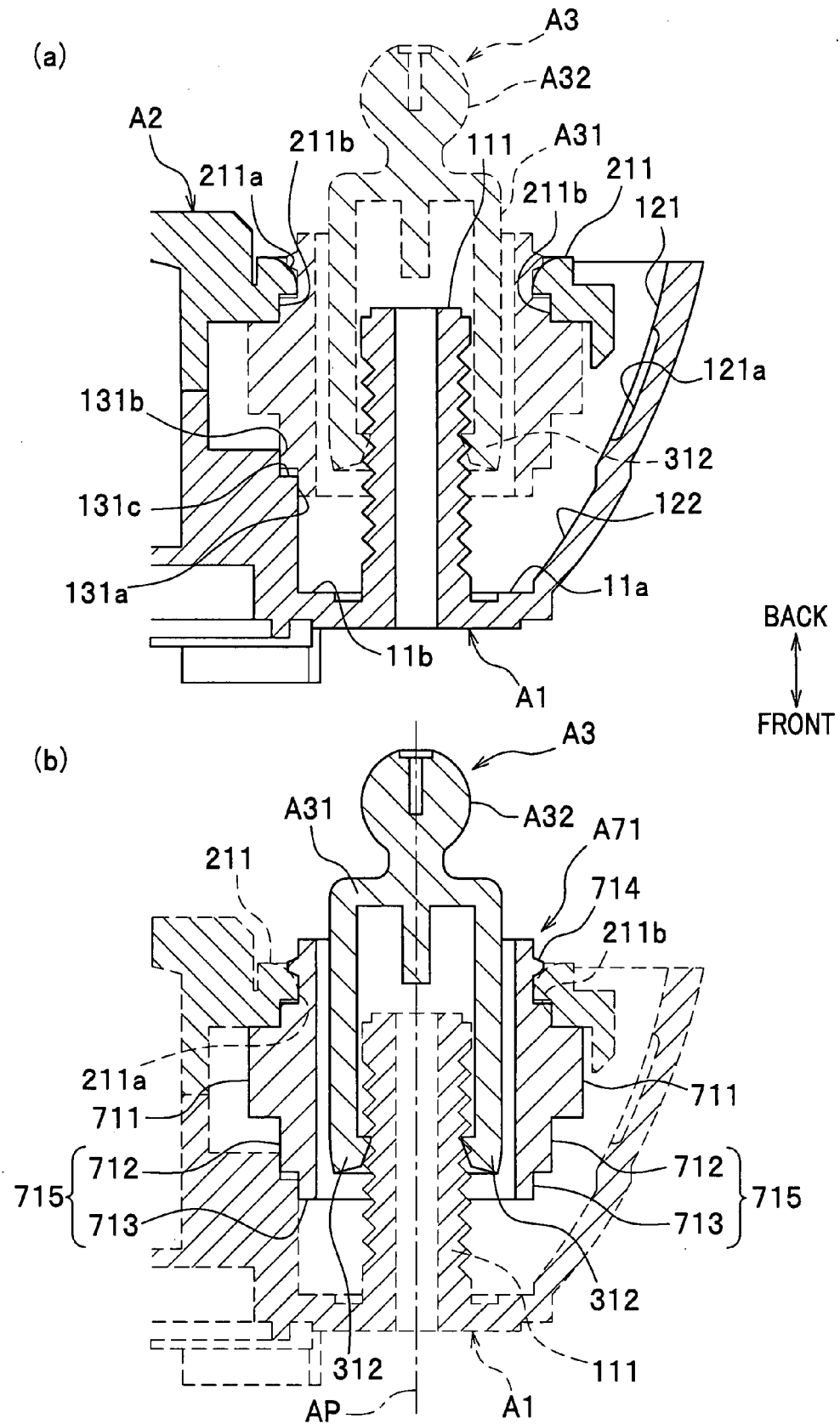
FIG. 11(a) is a cross-sectional view of a gear receiving part of the housing and a gear holding part of the cover.
FIG. 11(b) is a cross-sectional view of the rod and the worm wheel.

The gear holding parts 211 each serve as a portion for mainly holding the worm wheels A71 (that will be described later), and hold the individual worm wheel A71 in the state where each worm wheel A71 is undetachable along its central axis AP (see FIG. 11(b)) and is rotatable around the central axis AP. At each gear holding part 211, a circular opening 211a is formed, and as shown in FIG. 11(a), an annular step 211b having a diameter larger than that of the opening 211a is formed at a circumferential edge of the opening 211a on the side of the first housing A1.

Figure 9:
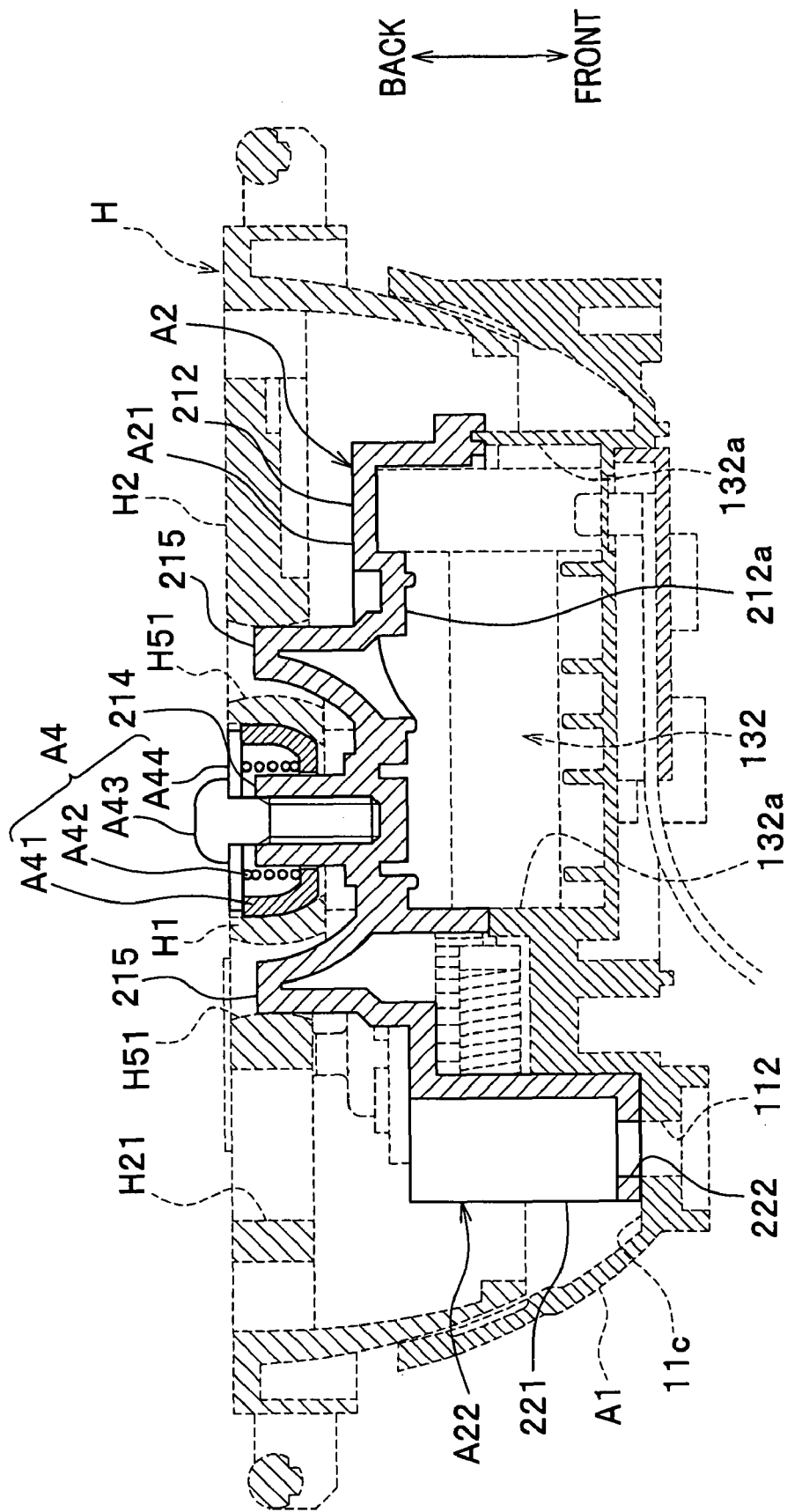
FIG. 9 is a cross-sectional view of a cover and a pressing means which are constituent elements of the actuator.

Furthermore, as shown in FIG. 9, on the side of the first housing A1 of the motor cover part 212, a cover-side motor containing part 212a is provided corresponding to the motor containing part 132. If the motor containing part 132 is covered with the motor cover part 212, a substantially watertight space is formed.

Each ring part 213 shown in FIG. 4 is formed at an outer edge of the main body A21, and is fitted to each sensor attachment part 133, when the second housing A2 is coupled to the first housing A1 (see FIG. 1).

The boss 214 is formed into a tubular shape having a bottom, and as shown in FIG. 9, a screw A43 for holding the support cap A41 is screwed into the inside of the boss 214.

Each stopper 215 shown in FIG. 4 serves as a portion for restraining the pivot plate H (see FIG. 1) from rotating in a circumferential direction of the receiving part 121, and a protruded end of each stopper 215 enters each opening H51 (see FIG. 2) of the pivot plate H when the pivot plate H is coupled to the actuator A. As shown in FIG. 1, in the state where the second housing A2 is coupled to the first housing A1, the stoppers 215 are surrounded by the receiving part 121. Thus, if the stoppers 215 are formed on an inner circumferential side of the first housing A1, an inner space of the first housing A1 can be effectively utilized, and as a consequence, the mirror surface angle adjusting device can be made compact.

The leg parts A22 shown in FIG. 4 are formed at positions corresponding to those of the second housing placement regions 11c (see FIG. 5(a) and FIG. 6) of the first housing A1. Each leg part A22 includes a circumferential wall 221 having an approximate C shape, and at its bottom portion, a screw hole 222 that communicates with the attachment hole 112 of the first housing A1 is formed as shown in FIG. 9. In order to fix the second housing A2 to the first housing A1, screws (not shown) may be inserted into the screw holes 222 of the second housing A2 and the attachment holes 112 of the first housing A1 from behind, and nuts (not shown) may be screwed to forwardly protrude the shaft portions of the screws. Since the positions of the attachment holes 112 of the first housing A1 correspond to those of the first through-holes H21 of the pivot plate H, a tool (not shown) can be inserted into the interior of each leg part A22 through the first through hole H21.

The second housing A2 can be molded with synthetic resin such as polyethylene, acrylonitrile-butadiene-styrene resin (ABS resin), polybutylene terephthalate (PBT resin) or polyamide (PA). In this case, the main body A21 and the leg parts A22 can be integrally molded.

Figure 10:
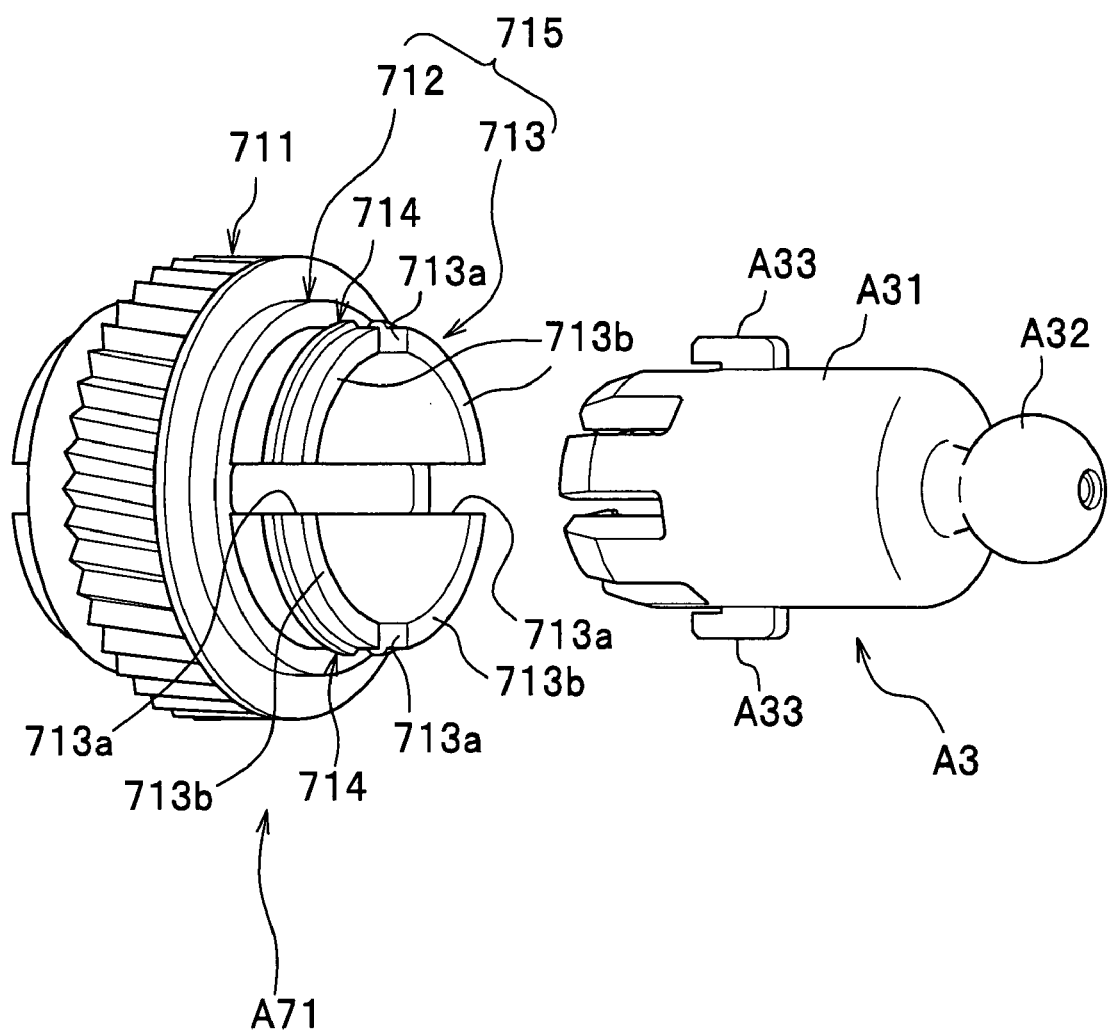
FIG. 10 is a perspective view of a rod and a worm wheel which are constituent elements of the actuator.

Each rod A3 shown in FIG. 1 moves forward or backward to push or pull the pivot plate H, and it includes a rod main body A31, a pivot A32 formed at a tip of this rod main body A31, and a pair of flanges A33, A33 provided to protrude at an outer circumferential face of the rod main body A31, as shown in FIG. 10.

The rod main body A31 has a cylindrical shape, and is fitted to the external thread portion 111 of the first housing A1 as shown in FIG. 11(b). It should be noted that a base end of the rod main body A31 is divided into a plurality of small pieces by a plurality of slits (see FIG. 10), and at an inner circumferential face of each of these small pieces, a claw portion 312 screwed to a thread of the external thread portion 111 is formed. Accordingly, if the rod main body A31 rotates around the central axis of the external thread portion 111, the pivot A32 moves forward or backward on the axis of the external thread portion 111.

Each pivot A32 is molded to have a spherical outer face, and mates with the engaging part H23 of the pivot plate H shown in FIG. 3(b). In the present embodiment, each pivot A32 undetachably mates with the engaging part H23, whereas its outer face slidably abuts against an inner face of the engaging part H23.

In the present embodiment, if one of the rods A3, A3 shown in FIG. 1 which is located at a lower part of the first housing A1 moves back or forth, the pivot plate H (i.e., the mirror M) is vertically tilted around the receiving part H1, and if the other rod A3 moves back or forth, the pivot plate H (i.e., the mirror M) is horizontally tilted around the receiving part H1.

The pressing means A4 shown in FIG. 1 is provided to urge the pivot plate H forward (i.e., toward the actuator A) and to connect the pivot plate H to the actuator A while maintaining the urged state, and it includes the support cap A41 to be fitted to and inserted into the receiving part H1 of the pivot plate H, an urging member A42 for providing a pressing force to the support cap A41, the screw A43 to be screwed onto the boss 214 of the actuator A, and a washer A44 fitted to the screw A43.

The support cap A41 has a spherical zone shape, and its outer surface is molded to a spherical shape. In this embodiment, as shown in FIG. 9, the radius of the spherical face constituting the outer circumferential face of the support cap A41 is substantially equal to the radius of the spherical face constituting an inner circumferential face of the receiving part H1 of the pivot plate H. In other words, the outer circumferential face of the support cap A41 slidably abuts against the inner circumferential face of the receiving part H1 of the pivot plate H.

The urging member A42 is coupled between the support cap A41 and the washer A44 while being compressed, and it presses the support cap A41 toward the actuator A by means of its resilience. It should be noted that in the present embodiment, a coil spring is used as the urging member A42, but the urging member A42 is not limited to a coil spring.

The washer A44 is formed into a shape having a size approximately equal to that of a rear end face of the support cap A41. Thus, the support cap A41 is prevented from being detached from the receiving part H1.

It should be noted that the configuration of the pressing means A4 is not limited to the illustrated one. It may have any configuration as long as being able to press the support cap A41 toward the actuator A. For example, although being not shown, a disc spring may be used as the urging means A42. In this case, a disc spring is located at a position of the washer A44.

The position sensors A5 shown in FIG. 1 are provided in order to detect the tilt of the pivot plate H, and are attached to the sensor attachment parts 133 in the present embodiment. It should be noted that each position sensor A5 is not particularly limited to any specific structure or form, but a sensor equipped with a contact is employed in the present embodiment. This contact is connected to each sensor attachment part 133 while being urged toward the pivot plate H, and its tip keeps in contact with the front side (back side) of the pivot plate H, and moves depending on the tilting movement of the pivot plate H. Then, by measuring a travel distance (protruded amount) of this contact, the state (i.e., the degree of the tilt) of the pivot plate H can be sensed.

Each motor A6 shown in FIG. 4 includes a motor main body A61, and a pair of male terminals A62, A62 protruding from the motor main body A61. A pair of the male terminals A62, A62 is connected to an adapter A63. This adapter A63 is interposed between a pair of the motors A6, A6 located in parallel and a terminal plate A64 attached to the front side of the first housing A1. In addition, four female terminals 631 to which the four male terminals A62 of the motors A6, A6 are to be connected are formed on a face of the adapter A63 opposed to a pair of the motors A6, A6. Meanwhile, three female terminals (not shown) corresponding to the terminal holes 132d (see FIG. 5(a)) are formed on a face of the adapter A63 opposed to the motor containing part 132. One of the two female terminals 631, 631 (to which the male terminals A62, A62 of one of the motors A6 are connected) and one of the two female terminals 631, 631 (to which the male terminals A62, A62 of the other motor A6 are connected) are short-circuited inside the adapter A63.

The gears A7 shown in FIG. 4 are each formed to include the worm wheel A71 fitted to the external thread portion 111 of the first housing A1, and the worm A72 attached to an output shaft of the motor A6. Each worm A72 meshes with a gearwheel portion 711 (see FIG. 10) of the worm wheel A71, and transmits a torque of the motor A6 to the worm wheel A71.

Each worm wheel A71 transmits the torque of the motor A6, which has been transferred through the worm A72, to the rod A3. Furthermore, the worm wheel A71 is fitted to the external thread portion 111 across a clearance where the rod A3 can be contained between an inner circumferential face of the worm wheel A71 and the outer circumferential face of the external thread portion 111.

The configuration of each worm wheel A71 is described in more detail. As shown in FIG. 10, the worm wheel A71 includes the annular gearwheel portion 711 having teeth formed at its outer circumferential face, a tubular portion 715 formed on the side of an inner circumferential face of this gearwheel portion 711, and an engaging portion 714 formed on an outer circumferential face of this tubular portion 715. In the present embodiment, the tubular portion 715 is formed to include an outer tubular portion 712 formed on the inner circumferential face of the gearwheel portion 711, and an inner tubular portion 713 formed on an inner circumferential face of this outer tubular portion 712. The engaging portion 714 is formed on an outer circumferential face of a rear end of the inner tubular portion 713. As shown in FIG. 11(b), the central axis (rotation axis) AP of the worm wheel A71 also serves as the central axis of the external thread portion 111.

The front and rear ends of the outer tubular portion 712 protrude from the gearwheel portion 711, and outer circumferential faces of the protruded parts are each molded to a cylindrical shape. More than half of the cylindrical face of the front end of the outer tubular portion 712 slidably abuts against the second circular face 131b of the gear receiving part 131 of the first housing A1 shown in FIG. 5(b) (see FIG. 11(a)). Meanwhile, the entire circumference of the cylindrical face of the rear end of the outer tubular portion 712 slidably abuts against the annular step 211b of the second housing A2 shown in FIG. 11(a).

As shown in FIG. 10, the front and rear ends of the inner tubular portion 713 protrude from the outer tubular portion 712, and outer circumferential faces of the protruded parts are each molded to a cylindrical shape. The inner tubular portion 713 is divided into a plurality of (in the present embodiment, four) pieces 713b, 713b, etc. by a plurality of slits 713a, 713a, etc. formed on the central axis AP (see FIG. 11(b)) of the inner tubular portion 713, and each piece 713b is inwardly elastically deformable. Each slit 713a is formed continuously on the central axis AP of the inner tubular portion 713. Further, the flanges A33 of the rod A3 mate with the slits 713a. Furthermore, the more than half of the circumference of the cylindrical face of the front end of the inner tubular portion 713 slidably abuts against the first circular face 131a of the gear receiving part 131 of the first housing A1 shown in FIG. 5(b) (see FIG. 11(a) and FIG. 11(b)). The entire circumference of the cylindrical face of the rear end of the inner tubular portion 713 slidably abuts against the opening 211a of the second housing A2 shown in FIG. 11(a).

As shown in FIG. 10, the engaging portion 714 consists of a linear protrusion provided to extend in a circumferential direction of the inner tubular portion 713 at an outer face of the rear end of the inner tubular portion 713, and mates with a circumferential edge of the opening 211a of the gear holding part 211 as shown in FIG. 11(b). Thus, the worm wheel A71 is prevented from being detached from the opening 211a. It should be noted that, although being not shown, a linear groove recessed in the circumferential direction of the inner tubular portion 713 may be used as the engaging portion 714. In this case, a linear protrusion fitted into the linear groove may be formed at the opening 211a of the gear holding part 211.

In order to attach the worm wheels A71 formed as described above to the actuator A, it is simply necessary to hold a rear end of each worm wheel A71 on each gear holding part 211 of the second housing A2, and to fix the second housing A2 to a predetermined position of the first housing A1. In order to mate the rear end of each worm wheel A71 with each gear holding part 211 of the second housing A2, it is merely necessary to insert the rear end (i.e., the pieces 713b) of the inner tubular portion 713 of each worm wheel A71 into the opening 211a of each gear holding part 211 while inwardly elastically deforming the rear end, and to mate the engaging portion 714 with the circumferential edge of the opening 211a of each gear holding part 211.

Furthermore, if such a holding structure for the worm wheels A71 is employed, simply by fitting the rear end of each worm wheel A71 into each gear holding part 211 of the second housing A2, each worm wheel A71 is held in an individual gear holding part 211 in the state where the worm wheel A71 is undetachable on its central axis AP (i.e., backward or forward), and is slidable and rotatable around the central axis AP (i.e., circumferentially). Thus, this axis can be determined simply and promptly, and as a consequence, it becomes possible to realize the simplification of assembly processes of the actuator A. In the present embodiment, at a front end of each worm wheel A71, the more than half of outer circumferential face of the inner tubular portion 713 abuts against the first circular face 131a of the gear receiving part 131 shown in FIG. 5(b). Furthermore, the more than half of outer circumferential face of the outer tubular portion 712 abuts against the second circular face 131b of the gear receiving part 131 shown in FIG. 5(b). Therefore, the front end of each worm wheel A71 would not be deviated vertically and horizontally.

Figure 12:
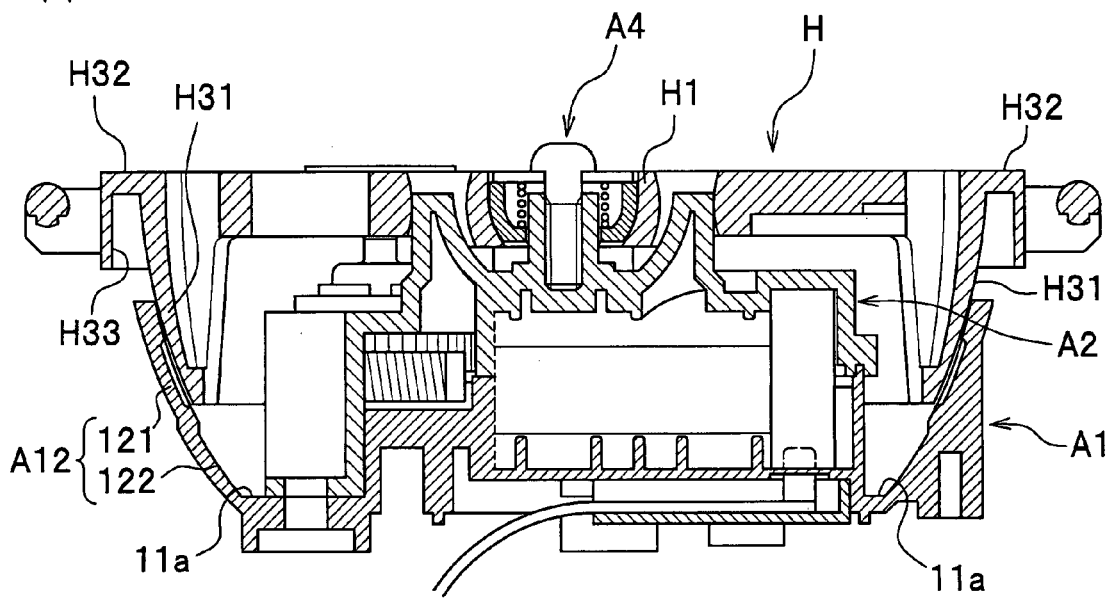
FIGS. 12(a) and (b) are cross-sectional views for describing an operation of the mirror surface angle adjusting device according to the embodiment of the present invention.
Figure 12:
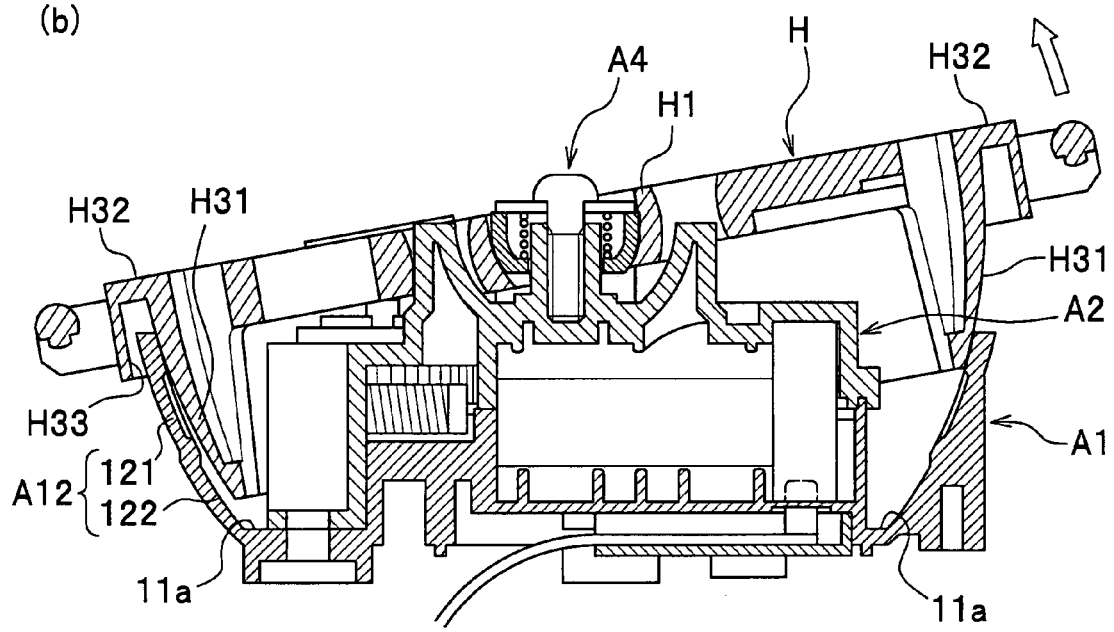

Hereinafter, a behavior of the actuator A will be described with reference to FIG. 1 and FIG. 4. When a controller or the like (not shown) controls the rotation of the motor A6 in an appropriate direction, a torque of the motor A6 is transmitted to the worm wheel A71 through the worm A72, and the worm wheel A71 then rotates around the external thread portion 111 of the first housing A1. The flanges A33 (see FIG. 10) of the rod A3 mate with the slits 713a (see FIG. 10) of the worm wheel A71, so that the worm wheel A71 and the rod A3 do not rotate independently of each other. Therefore, once the worm wheel A71 rotates, the rod A3 also rotates around the external thread portion 111 in conjunction with the rotation of the worm wheel A71. Furthermore, the claw portions 312 (see FIG. 11) of each rod A3 are screwed to the threads of each external thread portion 111. Therefore, the rod A3 moves back or forth on the axis of the external thread portion 111 while rotating around the external thread portion 111. As a result, this rod A3 pushes or pulls the pivot plate H forward or backward, thus allowing the pivot plate H to be tilted with respect to the actuator A (see FIG. 12(a) and FIG. 12(b)).

Moreover, in the mirror surface angle adjusting device formed as described above, the rods A3, A3 of the actuator A for pushing or pulling the pivot plate H are located inside the receiving part 121 for supporting the pivot plate H as shown in FIG. 1. Therefore, a load applied to the mirror M mainly acts on the receiving part 121. Accordingly, even if the coupling between the rods A3 and the pivot plate H is loosened, or even if the rod A3 has any dimensional difference or assembly error, the mirror M is held stably. Furthermore, since the annular sliding part H31 formed at the pivot plate H constantly abuts against the annular receiving part 121 formed at the first housing A1, water and/or dust will not enter from this abutted portion. Accordingly, it is possible to omit or simplify waterproof measures for the circumference of each rod A3 located inside the receiving part 121.

The stability of the mirror is enhanced, as the receiving part 121 is larger. Therefore, it is preferable that the receiving part 121 is as large as possible. However, in terms of the compactness of the mirror surface angle adjusting device, the first housing A1 is preferably as small as possible. Hence, in the present embodiment, the first housing A1 is formed into a bowl-like shape, and the receiving part 121 is formed at an edge of the first housing A1 in order to make the best use of the size thereof. This makes it possible to miniaturize the first housing A1 while ensuring the size of the receiving part 121 which can stably hold the pivot plate H. As a consequence, the miniaturization of the mirror surface angle adjusting device can be realized.

Moreover, in this mirror surface angle adjusting device, each worm wheel A71 is held mainly by the second housing A2 as shown in FIGS. 11(a) and 11(b). Thus, even if there is any an assembly error between the first and second housings A1 and A2, the assembly accuracy of each worm wheel A71 would not be affected badly. Moreover, the axis of each worm wheel A71 is determined at the time when it is held by the gear holding part 211 of the second housing A2, and in addition, each worm wheel A72 will not be detached along the central axis AP. Therefore, when the first housing A1 and the second housing A2 are assembled, a worker does not need to be careful not to cause a deviation in the position (i.e., the central axis AP) of each worm wheel A71. Furthermore, if each worm wheel A71 is attached to the second housing A2 in advance, the assembly of each worm wheel A71 is also completed simply by coupling the second housing A2 to the first housing A1. Thus, this mirror surface angle adjusting device can be assembled by simple and prompt processes.

Although the illustrative embodiment of the present invention has been described above, various modifications and changes can be made to this embodiment as long as they do not depart from the spirit and scope of the present invention which are defined by the appended claims.

To give an example, in the foregoing embodiment, the sliding part of the pivot plate goes inside the receiving part of the actuator has been exemplified. However, alternatively, the receiving part of the actuator may go inside the sliding part of the pivot plate. Specifically, the mirror surface angle adjusting device may be formed in such a way that an inner circumferential face of the sliding part of the pivot plate abuts against an outer circumferential face of the receiving part of the actuator.

Figure 14:
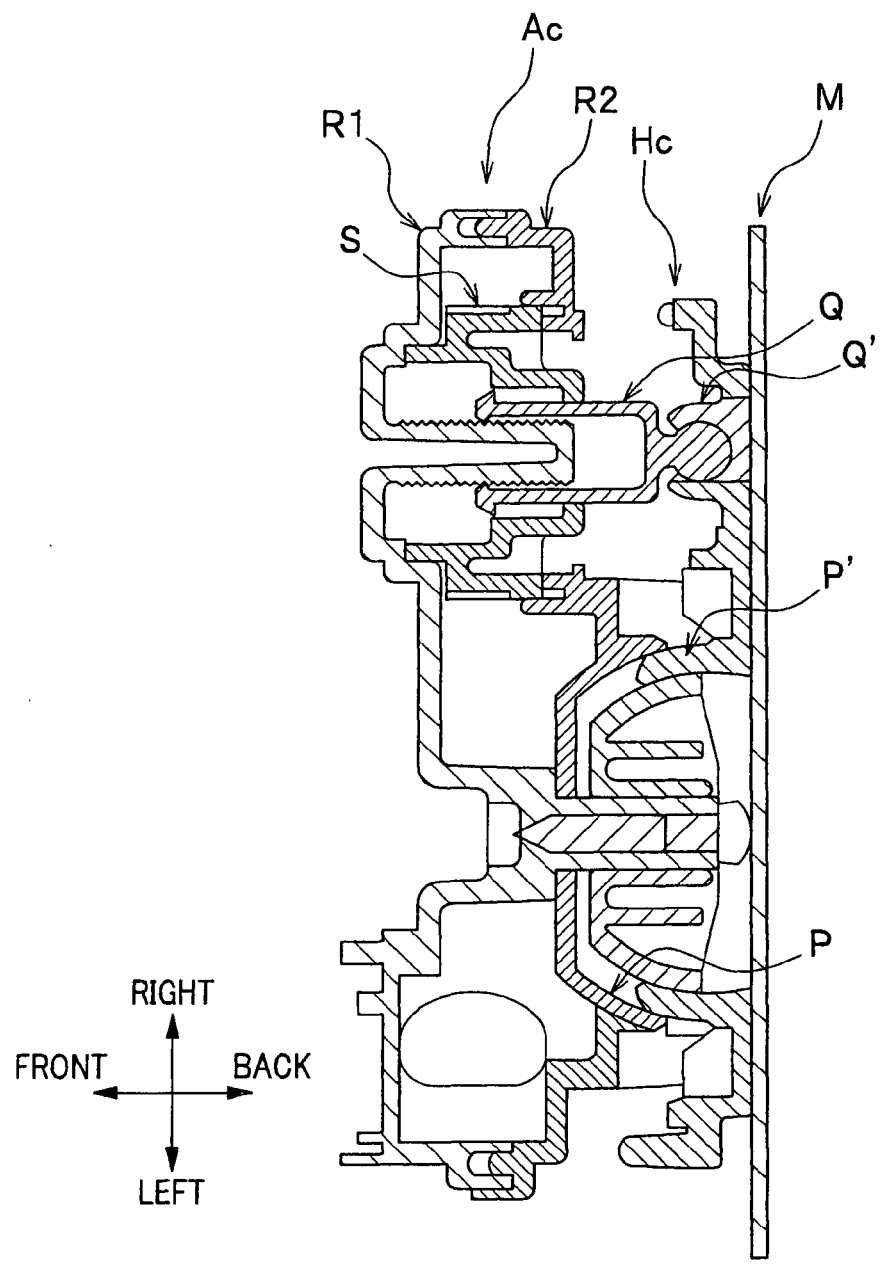
FIG. 14 is a cross-sectional view showing an inner part of an actuator of the mirror surface angle adjusting device shown in FIG. 13.

Moreover, in the foregoing embodiment, the case where the above-described worm wheel holding structure is applied to a mirror surface angle adjusting device provided with a first housing of a bowl-like shape has been exemplified. However, the present invention is not limited to such a case. Alternatively, the above-described worm wheel holding structure may be applied to a conventional mirror surface angle adjusting device shown in FIG. 13 and FIG. 14, for example.

The invention claimed is:

1. A mirror surface angle adjusting device comprising;
a pivot plate to be attached to a back side of a mirror, and
an actuator for holding the pivot plate, the actuator comprising:
a first housing;
one or more rods for pushing or pulling the pivot plate;
one or more motors for providing driving powers to the rods;
one or more worm wheels for transmitting the driving powers of the motors to the rods; and
a second housing being fixed to the first housing;
wherein the second housing comprises one or more gear holding parts, each of which has a circular opening formed therein,
wherein each of the worm wheels comprises:
an annular gearwheel portion;
an outer tubular portion being formed at an inner circumferential face of the gearwheel portion;
an inner tubular portion being formed on an inner circumferential face of the outer tubular portion; and
one or more engaging portions being formed on an outer circumferential face of the inner tubular portion, and
wherein when the one or more engaging portions mate with inner flanges of the openings formed in the gear holding parts, the worm wheels are held by the second housing in such a way that the worm wheels are not detached along their respective central axes and rotate around the respective central axes;
wherein the first housing further comprises a gear receiving portion provided correspondingly to an external thread in an approximately C shape so as to surround the external thread, the gear receiving portion having a first circular face and a second circular face adjoining the first circular face, and
wherein more than half of the outer circumferential face of the inner tubular portion abuts against the first circular face of the gear receiving portion, and more than half of the outer circumferential face of the outer tubular portion abuts against the second circular face of the gear receiving portion.

2. The mirror surface angle adjusting device according to claim 1, wherein the feature that the worm wheels are not detached along their respective central axes comprises the worm wheels being fixed in an axial direction thereof.

\* \* \* \* \*